(12) United States Patent
Tonkovich

(10) Patent No.: US 6,565,037 B1
(45) Date of Patent: May 20, 2003

(54) HYBRID AIRCRAFT AND METHODS OF FLYING

(76) Inventor: Gregory P. Tonkovich, 1 Recinto, Irvine, CA (US) 92620

( * ) Notice: Subject to any disclaimer, the term of this patent is extended or adjusted under 35 U.S.C. 154(b) by 0 days.

(21) Appl. No.: 10/161,915

(22) Filed: Jun. 4, 2002

(51) Int. Cl.[7] .................................. B64B 1/20
(52) U.S. Cl. ........................ 244/5; 244/29; 244/24
(58) Field of Search .................... 244/5, 24, 25, 244/29, 12.2, 23 C

(56) References Cited

U.S. PATENT DOCUMENTS

| | | | |
|---|---|---|---|
| 3,321,156 A | 5/1967 | McMasters | 244/5 |
| 3,820,744 A | 6/1974 | Denton | 244/5 |
| 4,014,483 A | 3/1977 | MacNeill | 244/5 |
| 4,120,468 A | 10/1978 | Fischer | 244/13 |
| 4,269,375 A | 5/1981 | Hickey | 244/26 |
| 4,606,515 A | 8/1986 | Hickey | 244/29 |
| 5,351,911 A | 10/1994 | Neumayr | 244/23 C |
| 5,755,402 A * | 5/1998 | Henry | 244/29 |
| 5,810,286 A * | 9/1998 | Matsler | 244/29 |
| 6,016,991 A | 1/2000 | Lowe, Jr. | 244/5 |
| 6,142,414 A * | 11/2000 | Doolittle | 244/25 |
| 6,196,498 B1 | 3/2001 | Eichstedt et al. | 244/5 |
| 6,278,904 B1 | 8/2001 | Ishii | 700/245 |
| 6,357,700 B1 * | 3/2002 | Provitola | 244/172 |

* cited by examiner

*Primary Examiner*—J. Woodrow Eldred
(74) *Attorney, Agent, or Firm*—Stout, Uxa, Buyan & Mullins, LLP; Donald E. Stout

(57) ABSTRACT

An aircraft includes an aircraft body that retains gas that is lighter than air and rotates about a vertical axis, and a cargo carrier attached to the body so that the carrier does not rotate with the body. The aircraft includes one or more propulsion devices that cause the aircraft body to rotate and to move laterally through air. The propulsion devices use gas retained in the aircraft body as fuel. One or more wings may extend from the body, which control the vertical motion of the aircraft during travel. A computerized navigation system is provided with the aircraft to permit the aircraft to be preprogrammed to travel a desired travel path, or to permit the aircraft to be remote controlled. The electronic components of the aircraft are powered by one or more power supplies, which may also act as ballast weights to raise the center of gravity of the aircraft as it spins, and to maintain tension on the aircraft body as fuel is consumed.

20 Claims, 3 Drawing Sheets

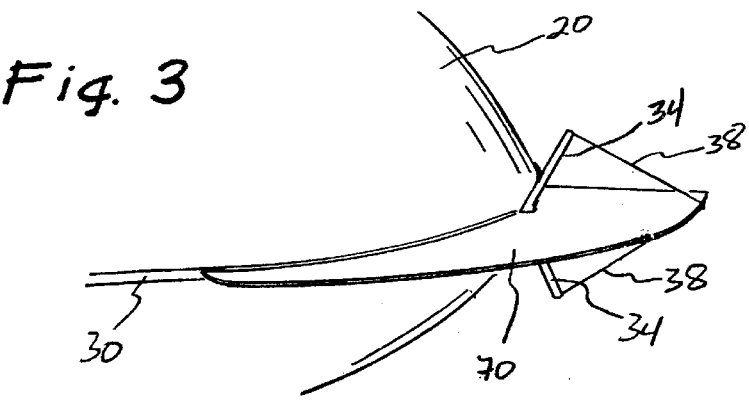
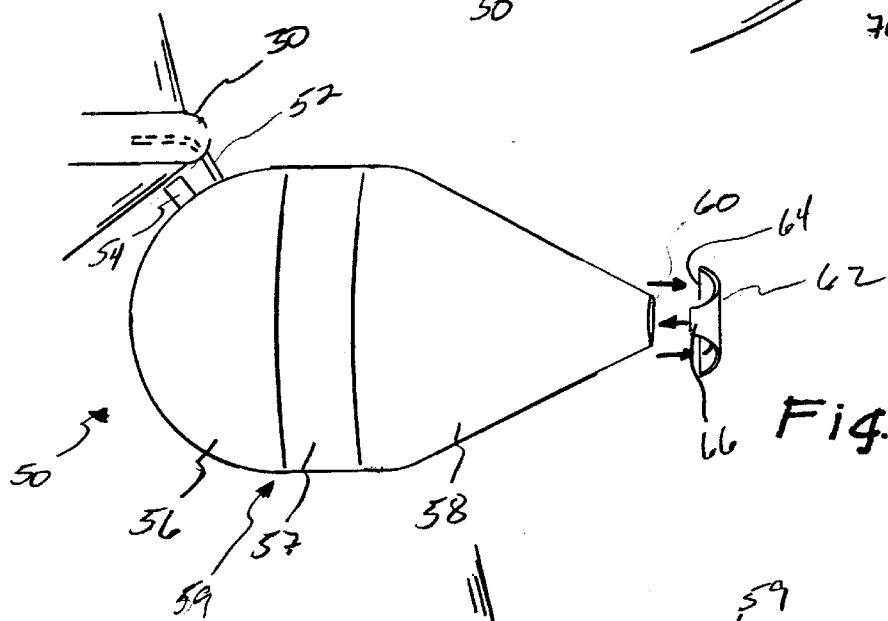
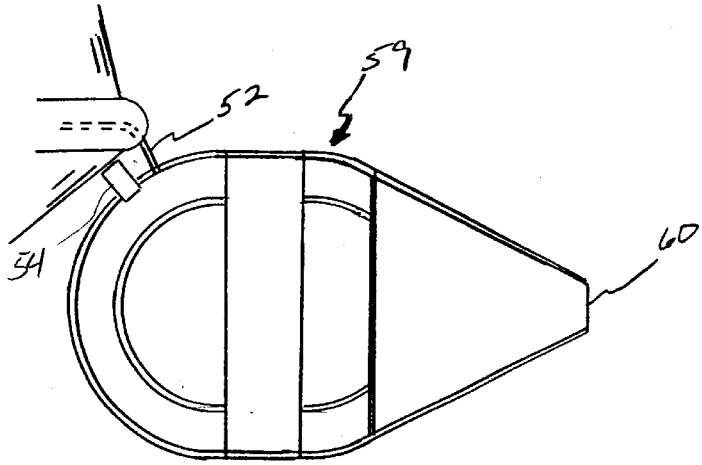

HYBRID AIRCRAFT AND METHODS OF FLYING

BACKGROUND

This invention relates generally to aircraft and methods for traveling through air, and more particularly, the invention relates to an aircraft that floats and is propelled by one or more propulsion devices.

Helicopters may be effective in maneuverability, but tend to be excessively costly to operate. This may be due to the helicopter's energy being primarily used as downward thrust to keep the helicopter airborne. Airships, such as blimps, do not experience the expenditure of energy associated with helicopters, but airships suffer from poor maneuverability.

Several types of aircraft are disclosed in the following U.S. Pat. Nos.: 3,321,156; 3,820,744; 4,014,483; 4,120,468; 4,269,375; 4,606,515; 5,351,911; 6,016,991; 6,196,498; and 6,278;904. None of the aircraft disclosed in these patents sufficiently combine the advantageous aspects of helicopters and airships to provide an aircraft that is maneuverable and energy efficient.

Thus, there remains an unmet need for aircraft and methods of flying that combine the maneuverability of a helicopter with the energy efficiency of airships.

SUMMARY

The aircraft of the invention generally is a hybrid between a helicopter and a blimp. The aircraft floats by retaining a volume of gas that is lighter than air so that the weight of the aircraft and any cargo carried by the aircraft, together, are less than zero gravity. The aircraft has a body that spins by the force generated by one or more propulsion devices attached to the body. The propulsion devices also cause the aircraft to move laterally through air. Wings may be provided on the aircraft to control the altitude of the aircraft as it is flying.

As disclosed herein, an aircraft may comprise an aircraft body that retains a gas lighter than air; at least one propulsion device attached to the perimeter of the aircraft body and obliquely oriented with respect to the aircraft body so that the propulsion device causes the aircraft body to spin about a vertical axis extending through the center of the aircraft body, and to laterally move through air during flight; and a cargo carrier attached to the aircraft body so that the cargo carrier does not rotate with the aircraft body.

The foregoing aircraft may be provided with a plurality of gas bags disposed within the aircraft body. In such an aircraft, at least one of the gas bags retains gas that is lighter than air and is used as fuel for the propulsion device or devices. The aircraft may comprise two or more propulsion devices. The propulsion device of the aircraft may comprise a gas line in communication with the interior of the aircraft body so that the gas retained in the aircraft body is used as fuel for the propulsion device. Certain embodiments of the aircraft may have propulsion devices that have a spark plug as an energy source to ignite fuel from the gas line to create a blast that is vented out of an exhaust port of the propulsion device. An air intake wing may be attached to the propulsion device so that air may be directed into the propulsion device as the aircraft body spins.

The aircraft may also comprise one or more wings attached to the perimeter of the aircraft body that controls the altitude of the aircraft as it is in flight. When a plurality of wings are attached to the aircraft, the wings may be disposed between two or more propulsion devices that are disposed around the perimeter of the aircraft body.

The aircraft may also have a counter rotation device that reduces rotation of the cargo carrier so that it does not rotate with the aircraft body as it spins. In certain aircrafts, the counter rotation device may be a vertically oriented fin laterally extending from the cargo container.

A plurality of weights may be disposed within the aircraft body so that the weights raise the center of gravity of the aircraft as the aircraft body spins. The weights may include one or more batteries that provide energy for the at least one propulsion device.

In one embodiment, the foregoing aircraft may also include a plurality of propulsion devices attached to the aircraft body; a plurality of wings attached to the perimeter of the aircraft body, each wing being disposed between two propulsion devices; and a computer navigation system that controls the activity of the propulsion devices and that is powered by at least one battery disposed on the inner surface of the aircraft body.

An aircraft, as disclosed herein, may also comprise an annular frame that has a plurality of spokes extending from the perimeter of the frame to the center of the frame; a gas bag that retains gas that is lighter than air and that is attached to the annular frame so that a majority of the gasbag is disposed on one side of the frame, and a minority of the gasbag is disposed on the opposite side of the frame; a plurality of propulsion devices attached to the frame and oriented at an angle to cause the frame to spin and to provide lateral motion to the aircraft, the propulsion devices are in fluid communication with the interior of the gasbag so that gas may flow from the gasbag to the propulsion device; an axle extending from the gas bag; and a cargo carrier attached to the axle so that the cargo carrier does not spin as the frame spins. This aircraft may also comprise a plurality of wings disposed around the aircraft and attached to the annular frame. In addition, one or more weights may be attached to the interior surface of the gasbag to keep tension on the gasbag as the aircraft spins. The cargo carrier of the aircraft may also include a counter rotating device coupled to the cargo carrier to prevent the cargo carrier from spinning with the frame.

A computerized navigation system that controls the movement of the aircraft as it travels to a destination may be provided with the aircraft. The computerized navigation system may include a compass, a triangulation system, and/or one or more computers.

In accordance with the invention disclosed herein, a method of flying an aircraft may comprise steps of: filling an aircraft body of an aircraft with a gas that is lighter than air so that the aircraft floats; directing the gas within the aircraft body through a gas line to a propulsion device that is attached to the aircraft body; igniting a spark plug disposed within the propulsion device to create a blast that is vented from an exhaust port of the propulsion device to cause the aircraft body to spin and to cause the aircraft to laterally move through the air; and moving one or more wings disposed along the perimeter of the aircraft body to maintain a desired altitude during flight.

Any feature or combination of features described herein are included within the scope of the present invention provided that the features included in any such combination are not mutually inconsistent as will be apparent from the context, this specification, and the knowledge of one of ordinary skill in the art.

Additional advantages and aspects of the present invention are apparent in the following detailed description and claims.

BRIEF DESCRIPTION OF THE FIGURES

FIG. 3 is a magnified view of a wing of the hybrid aircraft of FIG. 1.

FIG. 4 is a magnified side view of a propulsion device of the hybrid aircraft of figure 1.

FIG. 5 is a sectional view along line 5—5 of FIG. 2.

DETAILED DESCRIPTION

In reference to the disclosure herein, terms such as "up", "down", "top", "bottom", are in reference to the particular views of the aircraft illustrated in the accompanying drawings, and are not to be construed as delimiting of the particular configuration of the invention.

The aircraft disclosed herein generally includes a body that retains a gas, preferably a gas that is lighter than air, and a container for carrying cargo attached to the body. The body of the aircraft rotates about a vertical axis that extends through the center of the aircraft. The container is attached to the body in a manner that permits the body to rotate without causing the container to noticeably rotate. The rotation of the body of the aircraft may be caused by a plurality of propulsion devices that cause the body of the aircraft to rotate about the vertical axis, and control the lateral movement of the aircraft through air. The body of the aircraft also includes a plurality of wings to control the altitude of the aircraft as it moves through air. A navigation system may be provided with the aircraft. The navigation system of the aircraft includes at least one computer or microprocessor, which enables the aircraft to be controlled by way of a computer. Thus, the aircraft herein disclosed is a computer controlled aircraft that rotates about a vertical axis, and floats as it is propelled through air. The aircraft can be used to carry cargo, which includes, and is not limited to, inanimate objects, such as books, food, medical supplies, clothing, medicines, household supplies, and office supplies; and animate objects, such as animals, including humans.

Figure 1:
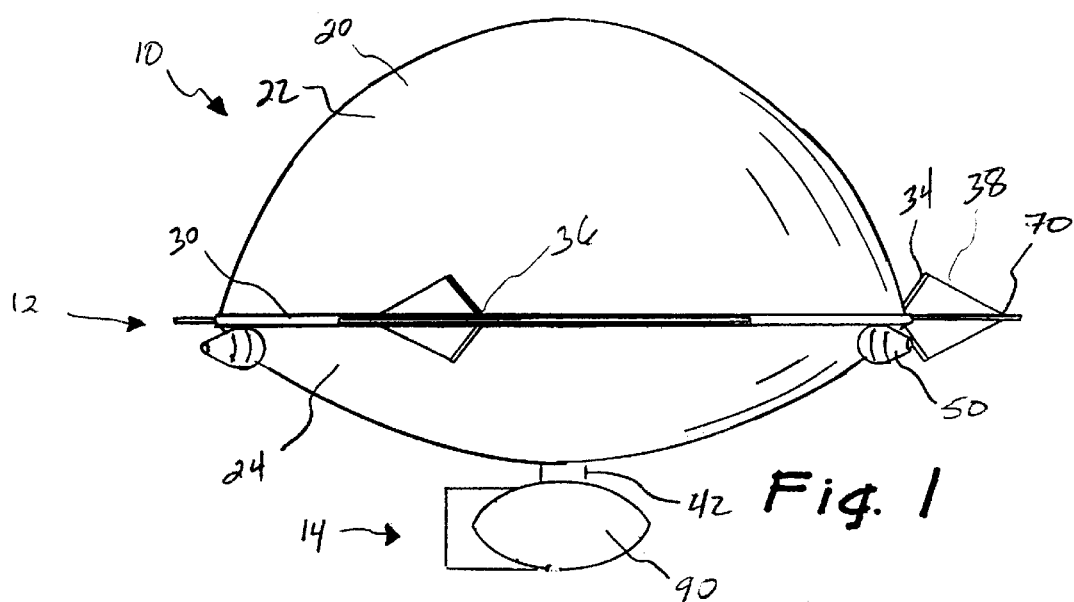
FIG. 1 is a side plan view of a hybrid aircraft.

FIG. 1 illustrates an aircraft 10 that comprises an aircraft body 12, and a cargo carrier 14 attached to aircraft body 12. Aircraft body 12 is an enclosed structure that retains gas, such as hydrogen or helium. Aircraft body 12 also includes at least one fuel port to permit gas to be directed into the aircraft body. As discussed herein, the gas may be used as a buoyancy mechanism, as a fuel source, or both. The material used in the manufacture of the aircraft body does not permit the gas contained therein to passively escape through the material making up the body. In the illustrated embodiment of the aircraft, aircraft body 12 comprises a gas bag, gas cell, or balloon 20 attached to a frame 30. Gas bag 20 has an upper portion 22 and a lower portion 24. As illustrated in FIG. 1, upper portion 22 defines a majority of aircraft body 12, and accordingly, lower portion 24 defines a minority of aircraft body 12. In one embodiment of the aircraft, upper portion 22 comprises about 60% to 75% of the volume of aircraft body 12. Gas bag 20 is of sufficient volume so that when the gas bag is filled with gas that is lighter than air, the weight of the aircraft, which includes the weight of the aircraft body, the cargo carrier, and the cargo being carried, is less than zero gravity. In one embodiment, gas bag 20 is made from mylar. In additional embodiments, gas bag 20 may be made from other materials, including and not limited to, nylon or latex, which materials may be coated on their inner surface to reduce permeability of the gas through the material. Accordingly, aircraft body 20 is an expandable, and compactable, or otherwise flexible, structure that retains gas.

Aircraft 10 generally includes an annular frame 30 that defines a perimeter of aircraft 10. Frame 30 is illustrated as having a generally circular shape (see FIG. 2, for example), but frame 30 may be shaped in any suitable geometry, including and not limited to, ovoid shapes (see FIG. 8, for example) and egg shapes (not shown). Frame 30 provides an attachment site, or attachment sites, for aircraft body 12, such as gas bag 20; propulsion devices 50; one or more wings 70; and one or more wing controllers 34. Frame 30 may be stabilized, as shown, by a plurality of tension wires, or spokes, 32 (see FIG. 7), which connect the perpendicular quadrants of the circle defined by the frame. The frame may be made of any suitable material that is lightweight and sufficiently strong to retain the shape of the aircraft body. Examples of suitable materials include, but are not limited to, plastics, metals or metal alloys, such as aluminum, or even composite materials, such as fiberglass composites.

Figure 2:
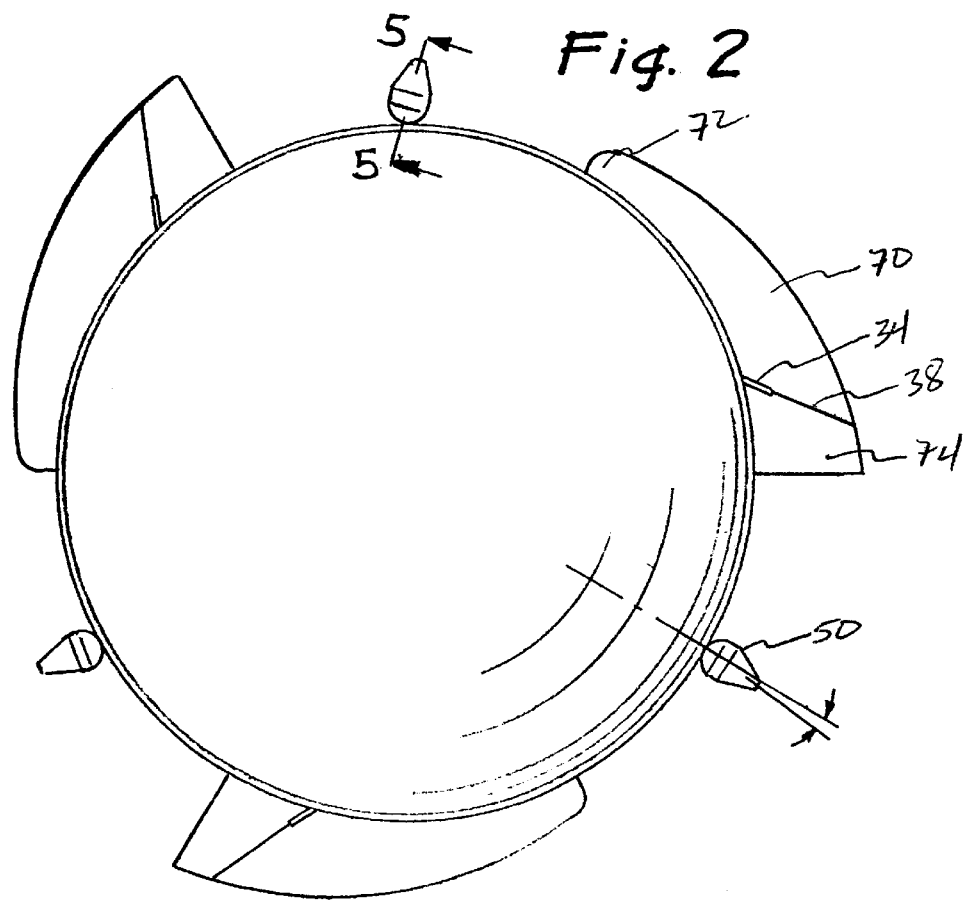
FIG. 2 is a top plan view of the hybrid aircraft of FIG. 1.
Figure 6A:
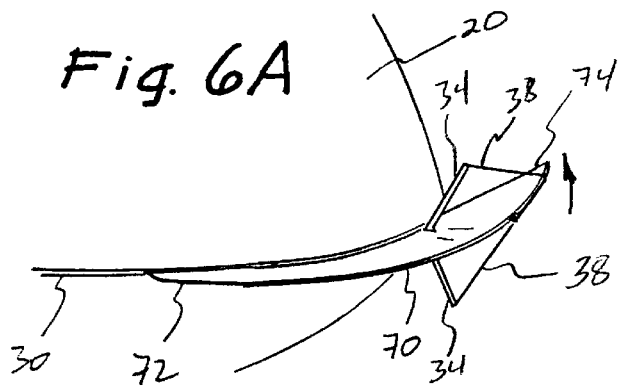
FIG. 6A is a magnified view of a wing of the hybrid aircraft of FIG. 1 as it is bent upward.
Figure 6B:
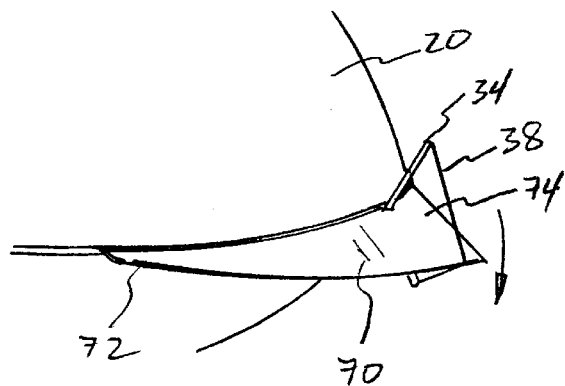
FIG. 6B is a magnified view of a wing of the hybrid aircraft of FIG. 1 as it is bent downward.

As illustrated in the accompanying figures, a plurality of wings, or blades, 70 extend from annular frame 30 of aircraft 10. Wings 70 generally extend from frame 30 and in the same plane as defined by frame 30. Wings 70 are used to control the vertical position or altitude of the aircraft as it is flying. Each wing 70 has a front end, or upstream end, 72; and a rear end, or downstream end, 74, as shown in FIG. 2. With reference to FIG. 2, the aircraft would spin in a counterclockwise direction. Wings 70 may be controlled by one or more wing controllers, levers, or arms, 34, which are pivotably attached to frame 30. Wing controller 34 is structured to extend over the top and bottom surfaces of wing 70. Wing controllers 34 are attached to frame 30 at a pivot point 36 so that they may pivot with respect to frame 30 as a hinge. The unattached end of wing controllers 34 are attached to the perimetric outer edge of wings 70 by a cable or wire 38. Each wing 70 may be pulled up or down by the actions of the wing controllers 34. For example, a wing 70 may roll upward by pulling an upper wing controller 34 toward the upper portion of the aircraft body (see FIG. 6A, for example). As the aircraft is flying, this bending of the wings combined with the spinning or rotating motion of the aircraft body will cause the aircraft to vertically descend. Similarly, and as shown in FIG. 6B, pulling the bottom wing controller towards the lower portion of the aircraft body will cause the wing to curl downward, which combined with the spinning or rotating motion of the aircraft body produces a lift of the aircraft. Because wings 70 are intended to curl up or down, they should be made from a suitably strong yet flexible material. Suitable materials for wings 70 include plastics and composites that flex to provide the desired altitude adjustment for the aircraft. The movement of wing controllers 34 is controlled by one or more motors, such as servo motors, that can be controlled by one or more computers, as discussed herein.

The rotation and lateral movement of aircraft 10 is accomplished by the actions of one or more propulsion devices 50. As illustrated in FIG. 4 and FIG. 5, propulsion devices 50 generally comprises a spherical body portion 56, a cylindrical body portion 57, and a conical body portion 58. Spherical body portion 56, cylindrical body portion 57, and conical body portion 58 define a hollow container 59. Propulsion devices 50 are attached to annular frame 30 so that exhaust ports 60 at the end of conical body portion 58 are oriented at an angle that is not perpendicular to annular frame 30 (see FIG. 2, for example). Propulsion devices may be attached to frame 30 using any suitable structure that provides a fixed connection between a propulsion device and the frame. For example, a propulsion device may be welded or adhesively secured to the frame, or may be attached by way of a rod or cable extending from the frame. In addition, propulsion devices 50 may be attached to frame 30 so that the angle of orientation of the propulsion device can be adjusted before or during flight. The angle of propulsion devices 50 helps produce spinning of aircraft body 12 when the propulsion devices are activated. The angle at which the propulsion devices are oriented should range from between one degree and ninety degrees from a line extending through the horizontal center of the aircraft 10, wherein a ninety degree angle of orientation would provide a line that is tangent to the perimeter of the aircraft near, or at, the site of attachment of the propulsion device. As persons of ordinary skill in the art will understand, an increased angle, or a more tangential orientation of the exhaust port, will enhance the spinning effect created by the propulsion devices. However, an angle of orientation is chosen so that the force produced by propulsion devices 50 not only causes aircraft body 12 to rotate, but to cause the aircraft to move laterally through the air so that the aircraft can travel to a destination. As illustrated in FIG. 2, each propulsion device is oriented at a similar angle with respect to aircraft body 12. In addition, three propulsion devices are illustrated approximately 120 degrees apart. In additional embodiments, more or fewer propulsion devices may be provided on the aircraft is and are approximately equally spaced about the perimeter of the aircraft body to maintain balance of the aircraft.

Each propulsion device 50 (as shown in FIGS. 4 and 5) has an energy source 54, which provides energy that is vented out of exhaust port 60. In one embodiment of the invention, the energy source is a spark plug. When the aircraft propulsion devices utilize a spark plug, the spark plug is positioned in the propulsion device so that the spark generated by the spark plug will be in proximity to a gas supply line 52. The spark plug will generate a spark that will cause a small blast or explosion within the propulsion device when it interacts with the hydrogen gas that has passed from aircraft body 12 to the propulsion device. The blast will be directed out of exhaust port 60 causing the aircraft body 12 to spin and the aircraft to move through the air. Gas supply line 52 is illustrated as extending into aircraft body 12 to permit gas retained in body 12 to be used as the fuel for propulsion devices 50. In the illustrated embodiment of the aircraft, hydrogen is used as the gas retained in aircraft body 12, and thus, the gas that is used to provide buoyancy to aircraft 10 is also used as a fuel to cause the aircraft to move. In addition, the use of hydrogen as a fuel reduces fuel emissions since the only combustion by-products are water and oxygen. Thus, the illustrated embodiment of the aircraft utilizes a gas line 52 that provides a direct communication from the gas retained in the aircraft body 12 to the propulsion devices 50.

Each propulsion device may be provided with an air intake wing 62 disposed in proximity to exhaust port 60. Air intake wing is positioned and structured to urge or direct air flow into hollow container 59. The illustrated embodiment of the air intake wing 62 of the aircraft includes an upstream end 64 and a downstream end 66. Air intake wing 62 may be curved from the upstream end 64 to downstream end 66 to cause air to be urged into hollow container 59 through exhaust port 60 as the aircraft body 12 rotates. Accordingly, in the illustrated aircraft, exhaust port 60 also acts as an air inlet port. Each propulsion device 50 includes at least one air intake wing 62. Because energy source 54 is operating at relatively high frequencies, for example, at approximately 4 Hz or more, a vacuum may potentially be created within hollow container 59. This frequency of operation causes the aircraft body 12 to rotate at approximately 60–100 rotations per minute. Air intake wings 62 reduce the likelihood that a vacuum is created within propulsion device 50, thereby facilitating the proper functioning of the devices as the energy sources are activated. Air intake wings 62 are attached to propulsion devices 50 by any suitable structure (not shown) that is rigid enough to hold air intake wings 62 in proximity to exhaust port 60 during the rotation of the aircraft body 12. Examples of suitable structures include cables, rods, wires, and equivalents thereof. The structures should be relatively thin so that the air flow across air intake wings 62 into exhaust port 60 is not substantially interrupted so that reduced air pressure is created within propulsion devices 50.

Figure 7:
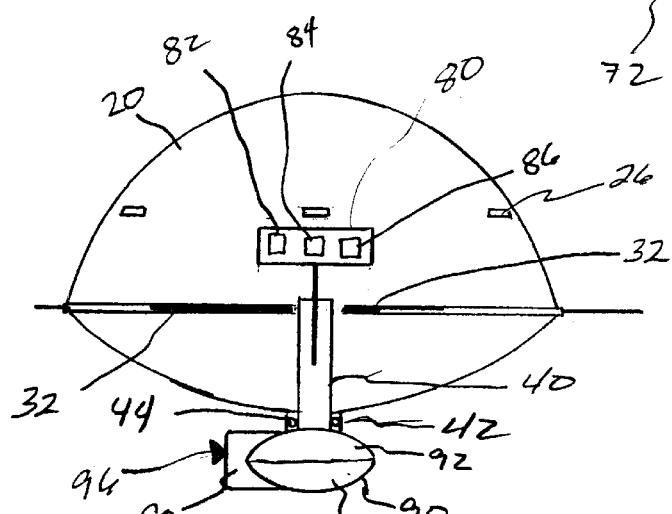
FIG. 7 is a section view of the hybrid aircraft of FIG. 1 along line 7—7 of FIG. 2.
Figure 8:
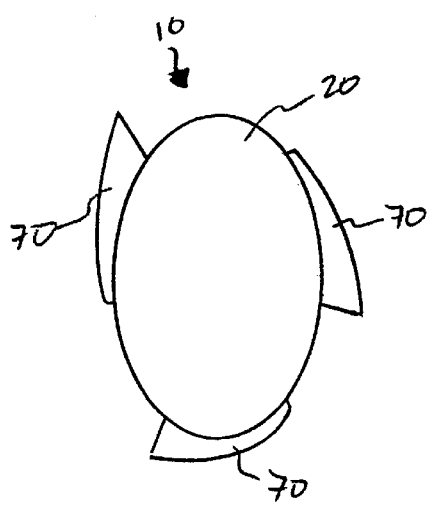
FIG. 8 is a top view of another hybrid aircraft.

Aircraft body 12 is attached to cargo carrier 14 so that cargo carrier 14 does not noticeably rotate as aircraft body 12 rotates. Cargo carrier 14 is illustrated as a container 90, which may comprise a container lid 92 and a container base 94. Container 90 is structured to provide access to the interior of the container so that the cargo being carried can be removed from the container. One or more springs may be included with carrier 14 to permit the carrier to automatically open and close to release cargo being carried. Cargo carrier 14 is attached to aircraft body 12 by a shaft or axle 40 extending from aircraft body 12. As shown in FIG. 7, axle 40 is attached at one end, e.g., the upper end, to spokes 32, which are connected to annular frame 30. Axle 40 is attached at the opposite end, e.g., the lower end, to a counter motion joint 42. At an intermediate point between the upper end and the lower end of the axle, aircraft body 12 is sealed around axle 40 to reduce, or preferably prevent, leakage of the gas contained within aircraft body 12. Counter motion joint 42 includes one or more ball bearings 44 as illustrated in FIG. 7. Cargo carrier 14 is attached to counter motion joint 42 so that carrier 14 does not noticeably rotate as aircraft body 12, and accordingly axle 40, rotate. To help reduce potential rotation of cargo carrier 14 that may develop from the rotation of axle 40 acting on bearings 44, a counter rotating device 96 may be provided with cargo carrier 14. As illustrated in FIG. 7, counter rotating device may be a fin 98 that laterally extends from carrier 14 in a vertical direction.

Aircraft 10 also includes a navigation system 80 (FIG. 7) that helps navigate the aircraft as it travels. Navigation system 80 may include a compass 82, a global positioning system (GPS) or other triangulation navigation device 84, and one or more computers 86, such as microprocessors. The compass is preferably an electronic compass that can provide directional information to one or more of the computers. The computers of the navigation system preferably control the timing of activation of energy sources 54. For example, if the aircraft 10 is intended to travel north, the navigation system will determine when the exhaust port of each propulsion device is facing south, and the computers will send a signal to the energy source to discharge every time the propulsion device is directed south. GPS receiver 84 will contribute to the navigation system determining the proper course of travel. The course may be preprogrammed before departure of the aircraft, or may be determined during flight. Computers 86 will also control the actions of wing controllers 34 to cause the aircraft to rise or descend. The wing controllers 34 are controlled by one or more servo motors that are operably connected to the computers, including wire and wireless connections, so that the computer can provide signals to control the servo motors.

The electronic components of aircraft 10 are operably connected to one or more power supplies, such as batteries (rechargeable or non-rechargeable) or energy generators. As illustrated in FIG. 7, the power supplies are weights 26 attached to the inner surface of aircraft body 12. In additional embodiments of the aircraft, the power supplies may be separate elements distinct from weights attached to the inner surface of aircraft body 12. Weights 26 are illustrated as being attached to upper portion 22 of gas bag 20. The positioning of weights 26 in the upper portion 22 of gas bag 20 helps raise the center of balance of the aircraft as it spins so that the propulsion devices are aligned with the moment of inertia of the aircraft. Weights 26 also keep tension on gas bag 20 as the aircraft body 12 rotates. As discussed herein, the illustrated aircraft may use the gas contained within gas bag 20 as fuel to power propulsion devices 50. As the fuel is consumed, the amount of gas in the gas bag decreases, and the gas bag will have a tendency to collapse. The centrifugal force created by the weights as the aircraft body spins pushes the weights away from the center of the aircraft and maintains the tension on gas bag 20.

The aircraft disclosed herein provides a vehicle capable of delivering cargo that is economical to operate, that saves time both for the consumer as well as the distributor, and that does not appreciably contribute to pollution of the environment. The aircraft may be preprogrammed with directions for each journey before the aircraft leaves its distribution center. The aircraft may travel at speeds of between approximately five to sixty miles per hour, and preferably travels at between approximately thirty to forty miles per hour.

By way of example, and not by way of limitation, the aircraft disclosed herein may be used to deliver food to a person's residence. After the order is placed, a person or computer at the restaurant will program the navigation system of the aircraft to travel to the person's residence and return to the restaurant. The aircraft body is filled with gas that is lighter than air to cause the aircraft to float. When the food is ready, it is placed in the cargo carrier, and the aircraft is dispatched from the restaurant to the person's residence. Using the computer controlled navigation system, the aircraft is able to accurately travel to the destination without encountering any obstacles. The aircraft will travel by expelling fuel into the propulsion devices so that a spark from a spark plug creates a blast to cause the aircraft to rotate and laterally move. The wings can be moved to maintain and control the altitude of the aircraft during flight. The aircraft will land at the residence and open the cargo carrier so that the person who ordered the food can remove the food from the carrier. The carrier is then closed, and the aircraft returns to the restaurant based on the preprogrammed information in the navigation system. An aircraft used for delivery of relatively small objects, such as objects less than ten pounds, will also be relatively small. The compact size contributes to the maneuverability of the aircraft. For example, the aircraft of the foregoing example may be approximately eight to ten feet in diameter, or otherwise sized so that it can land in a parking space, driveway, or roof top. As will be readily understood, when heavier or larger objects are being carried, the size of the aircraft body will also increase in order to maintain the buoyant properties of the aircraft.

Although the aircraft disclosed herein is illustrated with a single gas bag, additional embodiments of the aircraft may include aircraft bodies that have a plurality (i.e., two or more) gas bags to provide the buoyancy to the aircraft. For example, if hydrogen is not preferable as a sole gas, helium may be provided in one gas bag to provide buoyancy to the aircraft, and hydrogen may be provided in one or more smaller gas bags to be a fuel for the propulsion devices, as described hereinabove. The additional gas bag(s) of hydrogen may be disposed within the gas bag containing helium.

In addition, although the wing controllers are disclosed as "pulling" the wings up or down, other embodiments of the aircraft may include wing controllers that "push" the wings up or down.

Furthermore, counter rotation devices for the cargo carrier may include a motor that causes the cargo carrier to rotate in the opposite direction that the aircraft body is rotating. The motor may be a variable speed motor that can adjust its speed and actions depending on the rate of rotation of the aircraft body. For example, the speed of the electric motor may be adjusted based on information derived from an electronic compass of the navigation system. The aircraft disclosed herein may also include one or more sensors to reduce collisions between moving or non-moving obstacles. The sensors may be in communication with the navigation system to provide relevant information to the navigation system so that the travel path can be adjusted accordingly.

I claim:

1. An aircraft, comprising:
    an aircraft body that retains a gas lighter than air;
    at least one propulsion device attached to the perimeter of the aircraft body and obliquely oriented with respect to the aircraft body so that the propulsion device causes the aircraft body to spin about a vertical axis extending through a center of the aircraft body, and to laterally move through air during flight; and
    a cargo carrier attached to the aircraft body so that the cargo carrier does not rotate with the aircraft body.

2. The aircraft of claim 1, comprising a plurality of gas bags disposed within the aircraft body, at least one of the gas bags retaining gas that is lighter than air and is used as fuel for the at least one propulsion device.

3. The aircraft of claim 1, comprising a plurality of propulsion devices.

4. The aircraft of claim 1, wherein the at least one propulsion device comprises a gas line that is in communication with the interior of the aircraft body so that the gas retained in the aircraft body is used as fuel for the at least one propulsion device.

5. The aircraft of claim 4, wherein the at least one propulsion device comprises a spark plug that ignites the fuel from the gas line to create a blast that is vented out of an exhaust port of the propulsion device.

6. The aircraft of claim 1, further comprising an air intake wing attached to the at least one propulsion device so that air may be directed into the propulsion device as the aircraft body spins.

7. The aircraft of claim 1, further comprising at least one wing attached to the perimeter of the aircraft body that causes the aircraft to ascend or descend as the wing is angled down or up.

8. The aircraft of claim 7, comprising a plurality of wings spaced apart around the perimeter of the aircraft body.

9. The aircraft of claim 8, wherein each wing is disposed between a plurality of propulsion devices that are disposed around the perimeter of the aircraft body.

10. The aircraft of claim 1, further comprising a computerized navigation system that controls the movement of the aircraft as it travels to a destination.

11. The aircraft of claim 1, further comprising a counter rotation device that reduces rotation of the cargo carrier so that it does not rotate with the aircraft body.

12. The aircraft of claim 11, wherein the counter rotation device is a vertically oriented fin laterally extending from the cargo container.

13. The aircraft of claim 1, further comprising a plurality of weights disposed within the aircraft body so that the weights raise the center of gravity of the aircraft as the aircraft body spins.

14. The aircraft of claim 13, wherein the plurality of weights include one or more batteries that provide energy for the at least one propulsion device.

15. The aircraft of claim 1, comprising:
   a plurality of propulsion devices attached to the aircraft body;
   a plurality of wings attached to the perimeter of the aircraft body, each wing being disposed between two propulsion devices; and
   a computer navigation system that controls the activity of the propulsion devices and that is powered by at least one battery disposed on the inner surface of the aircraft body.

16. An aircraft, comprising:
   an annular frame having a plurality of spokes extending from the perimeter of the frame to the center of the frame;
   a gas bag that retains gas that is lighter than air and that is attached to the annular frame so that a majority of the gasbag is disposed on one side of the frame, and a minority of the gasbag is disposed on the opposite side of the frame;
   a plurality of propulsion devices attached to the frame and oriented at an angle to cause the frame to spin and to provide lateral motion to the aircraft, the propulsion devices are in fluid communication with the interior of the gasbag so that gas may flow from the gasbag to the propulsion device;
   an axle extending from the gas bag; and
   a cargo carrier attached to the axle so that the cargo carrier does not spin as the frame spins.

17. The aircraft of claim 16, comprising a plurality of wings disposed around the aircraft and attached to the annular frame.

18. The aircraft of claim 16, comprising at least one weight attached to the interior surface of the gasbag to keep tension on the gasbag as the aircraft spins.

19. The aircraft of claim 16, comprising a counter rotating device coupled to the cargo carrier to prevent the cargo carrier from spinning with the frame.

20. A method of flying an aircraft, comprising steps of:
   filling an aircraft body of an aircraft with a gas that is lighter than air so that the aircraft floats;
   directing the gas within the aircraft body through a gas line to a propulsion device that is attached to the aircraft body;
   igniting a spark plug disposed within the propulsion device to create a blast that is vented from an exhaust port of the propulsion device to cause the aircraft body to spin and to cause the aircraft to laterally move through the air; and
   moving one or more wings disposed along the perimeter of the aircraft body to maintain a desired altitude during flight.

\* \* \* \* \*